United States Patent
Arend et al.

(12)

(10) Patent No.: US 6,345,985 B1
(45) Date of Patent: Feb. 12, 2002

(54) SYSTEM AND METHOD FOR CREATING STAR-SHAPED FIGURES

(76) Inventors: Todd J. Arend, 3822 Waldo Pl., Columbus, OH (US) 43220; Ronald A. Thiemann, 5195 State Rte. 128, Miamitown, OH (US) 45041

( * ) Notice: Subject to any disclaimer, the term of this patent is extended or adjusted under 35 U.S.C. 154(b) by 0 days.

(21) Appl. No.: 09/332,917

(22) Filed: Jun. 14, 1999

(51) Int. Cl.$^7$ ............................................... G09B 11/00
(52) U.S. Cl. ........................................... 434/85; 434/87
(58) Field of Search ............................... 434/85, 87, 81; 33/474, 476, 482, 565, 428, 19.2

(56) References Cited

U.S. PATENT DOCUMENTS

| | | | | |
|---|---|---|---|---|
| 1,619,427 A | * | 3/1927 | McCaffery | 33/476 |
| 1,723,517 A | * | 8/1929 | McFadden | 33/474 |
| 1,974,442 A | * | 9/1934 | Baldwin | 434/87 |
| 2,797,493 A | * | 7/1957 | Watson | 33/565 |
| 3,535,791 A | * | 10/1970 | Oppenheim | 434/85 |
| 3,604,118 A | * | 9/1971 | Miller | 33/474 |
| 3,766,654 A | * | 10/1973 | Canton | 33/565 |
| 4,912,849 A | * | 4/1990 | MacCarthy | 33/1 AA |
| 4,976,620 A | * | 12/1990 | Tacquard | 434/81 |
| 5,444,920 A | * | 8/1995 | Nelson | 33/494 |
| 5,864,959 A | * | 2/1999 | Johansen | 33/474 |

* cited by examiner

Primary Examiner—Jacob K. Ackun, Jr.
Assistant Examiner—K Fernstrom
(74) Attorney, Agent, or Firm—Porter Wright and Arthur, LLP

(57) ABSTRACT

An apparatus and method for created star-shaped figures is disclosed. The apparatus for drawing a star having a plurality of points is includes a guide piece having a plurality of spokes corresponding in number to the plurality of points of the star and radiating from a central point and a triangular stencil having a plurality of guidelines extending from a first side of the stencil to a second side of the stencil and a vertical centerline placed over the guide piece. The method for using the includes the steps of marking a center of the drawing surface, placing the guide piece on drawing surface with the central point above the center of the drawing surface, placing the stencil on the guide piece with the vertical centerline over one of the plurality of spokes and with one of the plurality of guidelines passing through the central point, drawing lines using the stencil as a guide along the first and second sides of the stencil, rotating the stencil with the vertical centerline over another one of the plurality of spokes and with the one of the plurality of guidelines passing through the central point, drawing lines using the stencil as a guide along the first and second sides of the stencil, and repeating the steps of rotating and drawing as often as needed until the star is completed.

5 Claims, 8 Drawing Sheets

SYSTEM AND METHOD FOR CREATING STAR-SHAPED FIGURES

BACKGROUND OF THE INVENTION

1. Field of Invention

This invention pertains to the art of methods and apparatuses for drawing stars, and more to specifically to methods and apparatus for drawing stars using guide pieces and a stencil.

2. Description of the Related Art

Certain types of stencils for drawing geometric shapes are well known, for example, compasses may be used to draw circles with varying radii, and French curves may be used to draw assorted curvilinear figures. However, there has been no apparatus and method for using the apparatus for drawing stars varying from three-pointed stars to eight-pointed stars.

The present invention contemplates a new and improved method and apparatus for creating and drawing star-shaped figures ranging from three-pointed figures to eight-pointed stars, which is simple in design, effective in use, and overcomes the foregoing difficulties and others while providing better and more advantageous overall results.

SUMMARY OF THE INVENTION

In accordance with the present invention, a new and improved method and apparatus for creating and drawing star-shaped figures is provided that is simple to use and enables the creation of star-shaped figures, patchwork stars and applique stars and templates.

According to one aspect of the present invention, an apparatus for drawing a star having a plurality of points is disclosed that includes a guide piece having a plurality of spokes corresponding in number to the plurality of points of the star and radiating from a central point and a triangular stencil having a plurality of guidelines extending from a first side of the stencil to a second side of the stencil and a vertical centerline placed over the guide piece.

According to another aspect of the present invention a method of drawing a star on a drawing surface using a guide piece having a plurality of spokes radiating from a central point and a triangular stencil having a plurality of guidelines extending from a first side of the stencil to a second side of the stencil and a vertical centerline is disclosed including the steps of marking a center of the drawing surface, placing the guide piece on drawing surface with the central point above the center of the drawing surface, placing the stencil on the guide piece with the vertical centerline over one of the plurality of spokes and with one of the plurality of guidelines passing through the central point, drawing lines using the stencil as a guide along the first and second sides of the stencil, rotating the stencil with the vertical centerline over another one of the plurality of spokes and with the one of the plurality of guidelines passing through the central point, drawing lines using the stencil as a guide along the first and second sides of the stencil, and repeating the steps of rotating and drawing as often as needed until the star is completed.

One advantage of the present invention is the ability to draw a plurality of different-pointed stars using the same stencil.

Another advantage of the present invention is that it may be used to create applique stars.

Another advantage of the present invention is that it may be used to create patchwork stars.

Another advantage of the present invention is that it may be used to create layered stars.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

DETAILED OF THE PREFERRED EMBODIMENT

Figure 1:
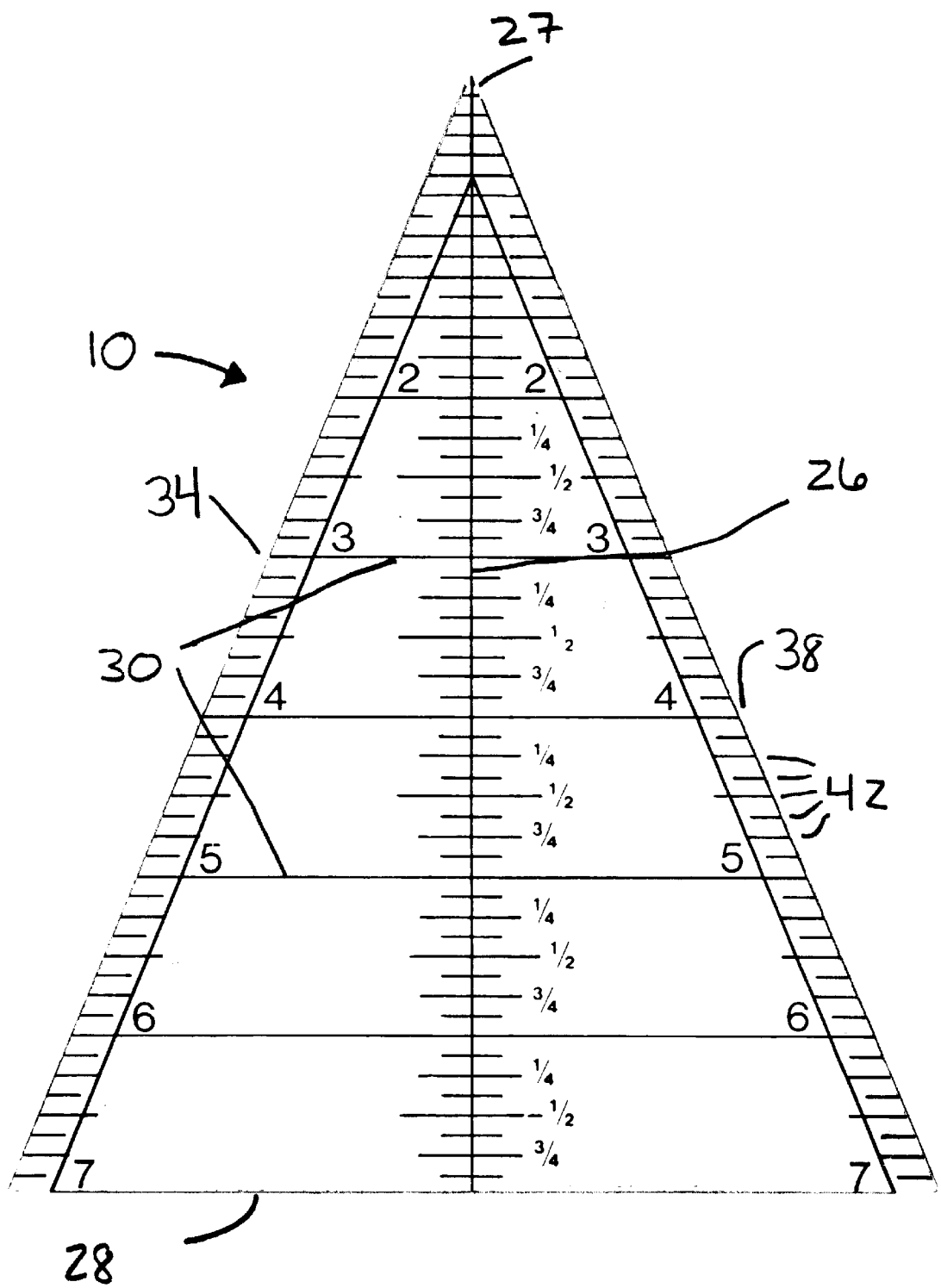
FIG. 1 shows a stencil according to the present invention.

Referring now to the drawings wherein the showings are for purposes of illustrating a preferred embodiment of the invention only and not for purposes of limiting the same, FIG. 1 shows a stencil 10 used to draw stars according to the present invention. As used herein, the term star not only includes geometric figures with five or more points according to the traditional definition, but also geometric figures with three and four points that also have concave sides similar to stars of the traditional five or greater pointed variety. FIGS. 2A through 2F show a variety of guide pieces 14 that are used in connection with the stencil 10 to draw the stars.

Figure 2A:
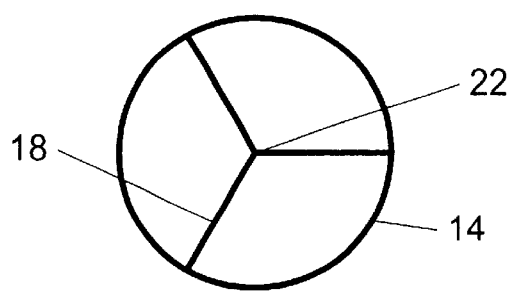
FIGS. 2A through 2F show a variety of guide pieces that are used in connection with the stencil to draw the stars according to the present invention.
Figure 2B:
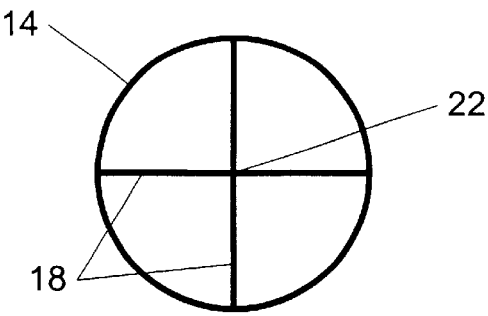
Figure 2C:
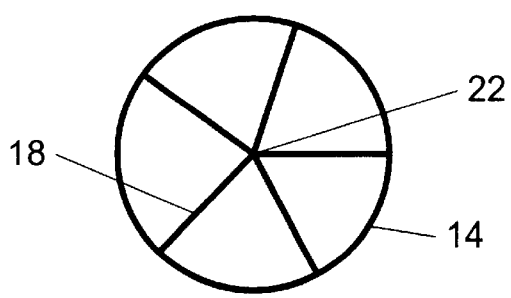
Figure 2D:
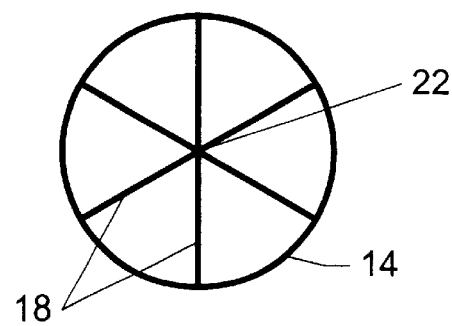
Figure 2E:
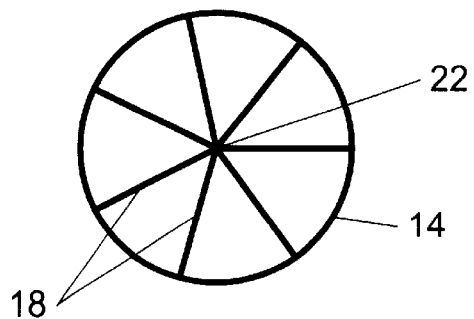
Figure 2F:
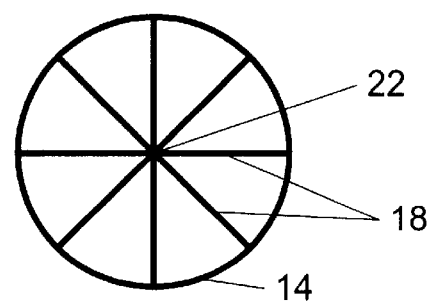

FIG. 2A shows a guide piece 14 with 3 spokes 18 radiating from a central point 22 of the guide piece 14. The number of spokes 18 radiating from a central point 22 indicates the number of points that will be found on the star drawn with the associated guide piece 14. The guide piece 14 of FIG. 2A will thus result in a three-pointed star. The guide piece 14 of FIG. 2B will result in a 4-pointed star. The guide piece 14 of FIG. 2C will result in a five-pointed star. The guide piece 14 of FIG. 2D will result in a six-pointed star. The guide piece 14 of FIG. 2E will result in the seven-pointed star. The guide piece 14 of FIG. 2F will result in a eight-pointed star. Each of the guide pieces 14 are preferably a sticker with the spokes 18 and center point 22 printed thereon. However, according to the present invention, the guide pieces 14 may also be made of any other materials, such as plastic, metal, paper or any other suitable material.

With continuing reference to FIG. 1, the stencil 10 is preferably made of a translucent material, such as clear plastic, with a vertical center line 26 running from the top 27 of the stencil 10 to the bottom 28 of the stencil 10. The stencil 10 also preferably has a series of guide lines 30 extending from one side 34 of the stencil 10 to a second side 38 of the stencil 10. These guide lines 30 are preferably spaced 1.0 inch apart. The stencil 10 preferably has a number of ruler-type gradations 42 spaced at 0.5 inch (½ inch), 0.25 inch (¼ inch) and 0.125 inch (⅛ inch) intervals.

Figure 3A:
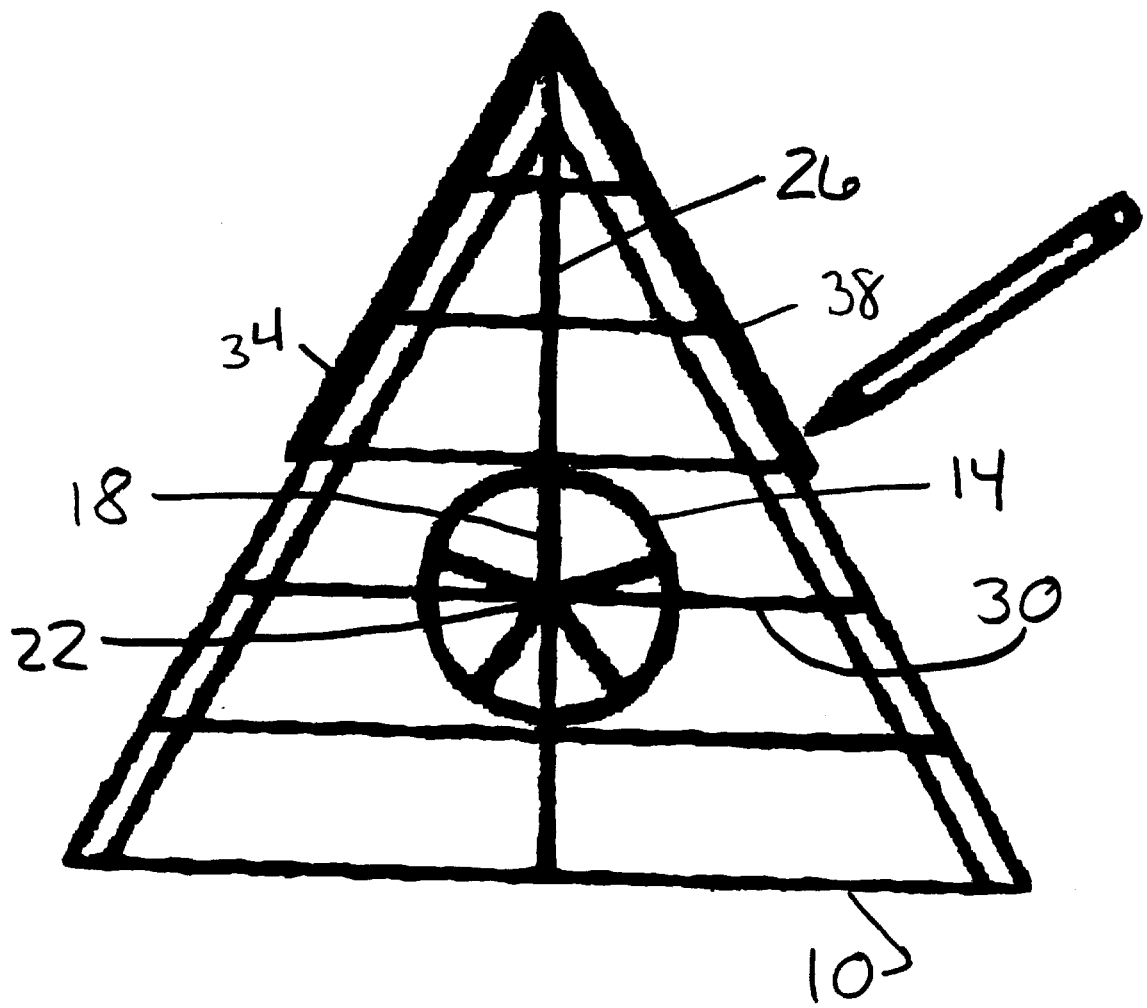
FIGS. 3A through 3E show the steps of drawing a star according to the present invention.
Figure 3B:
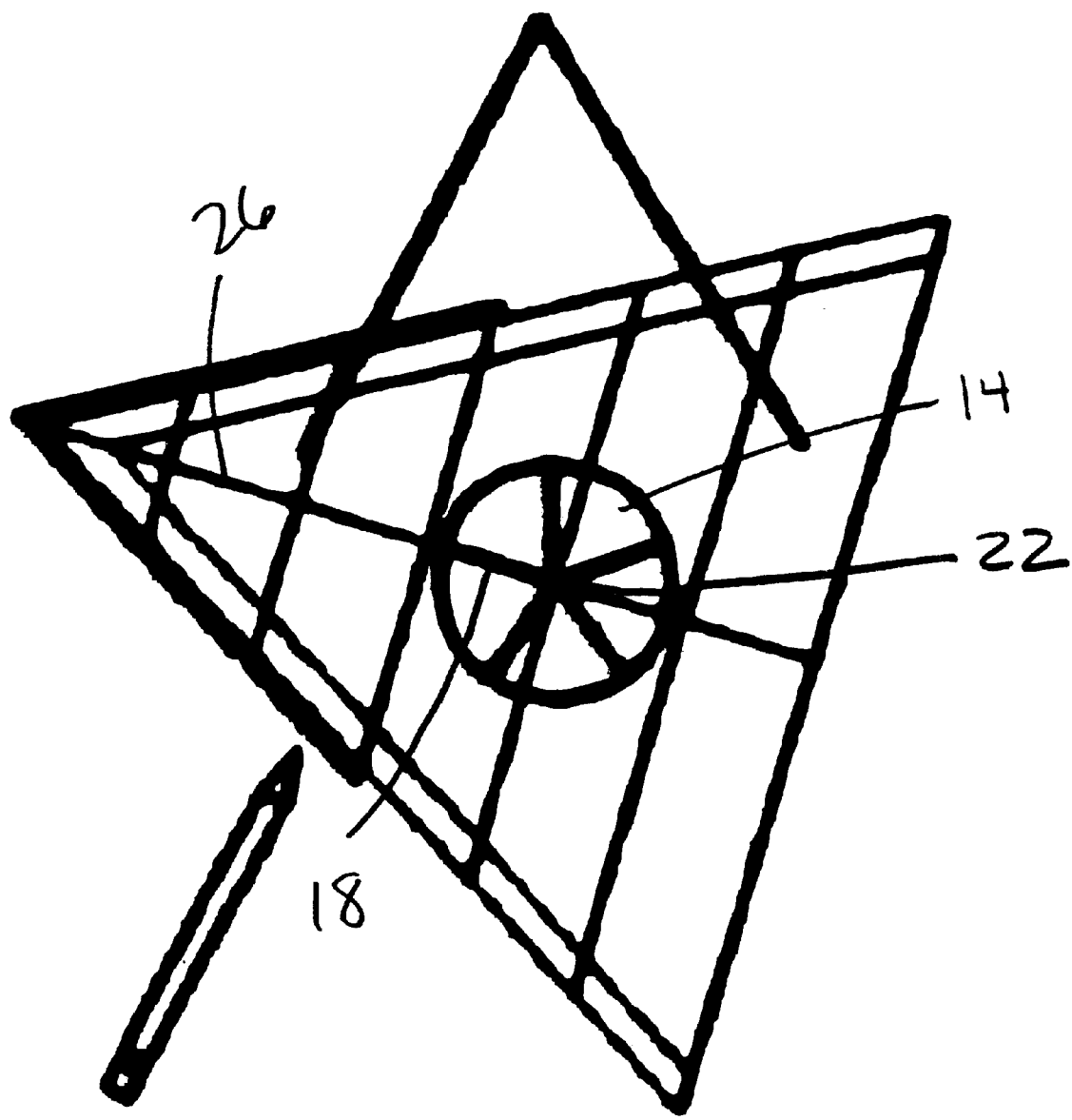
Figure 3C:
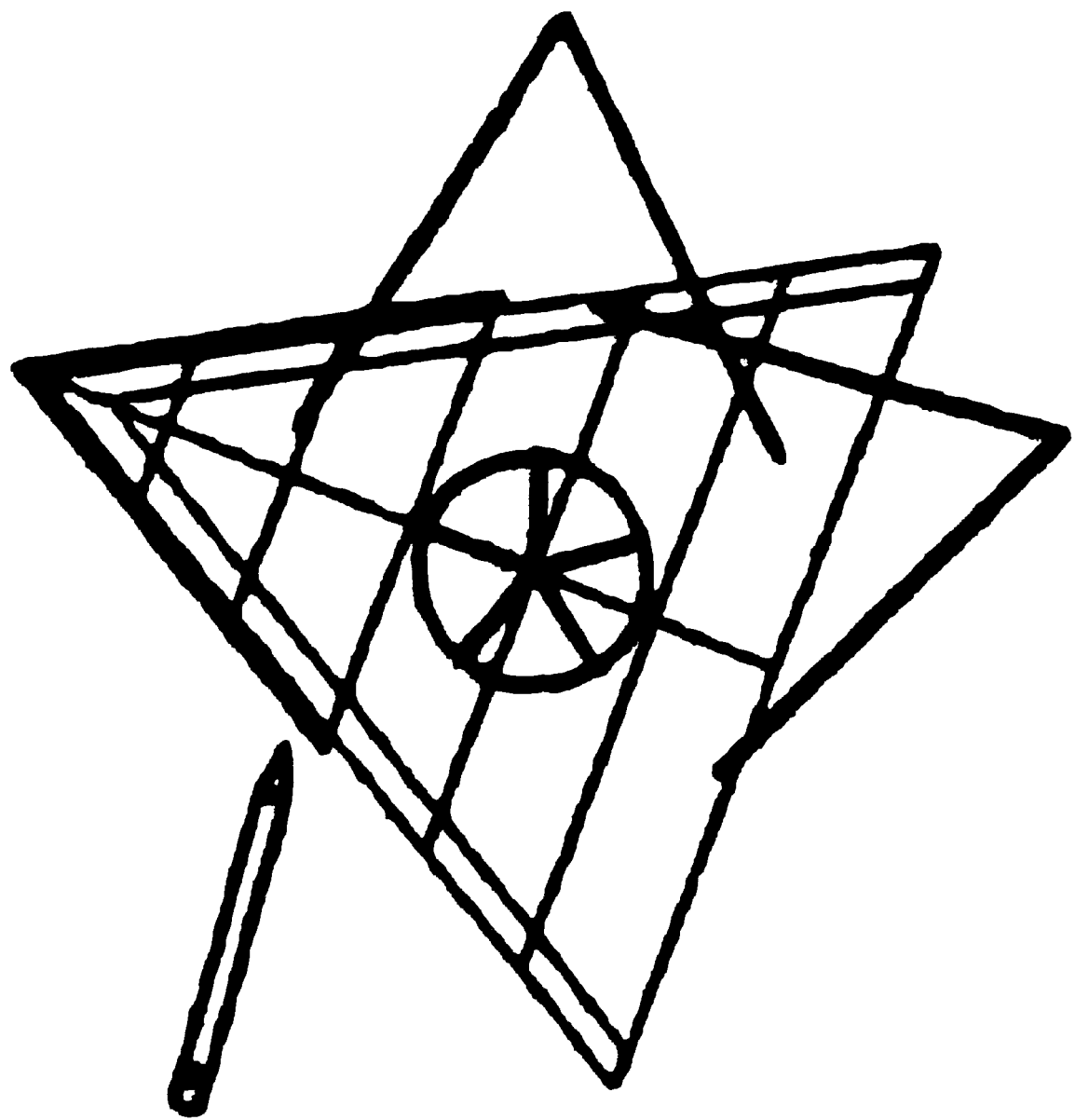
Figure 3D:
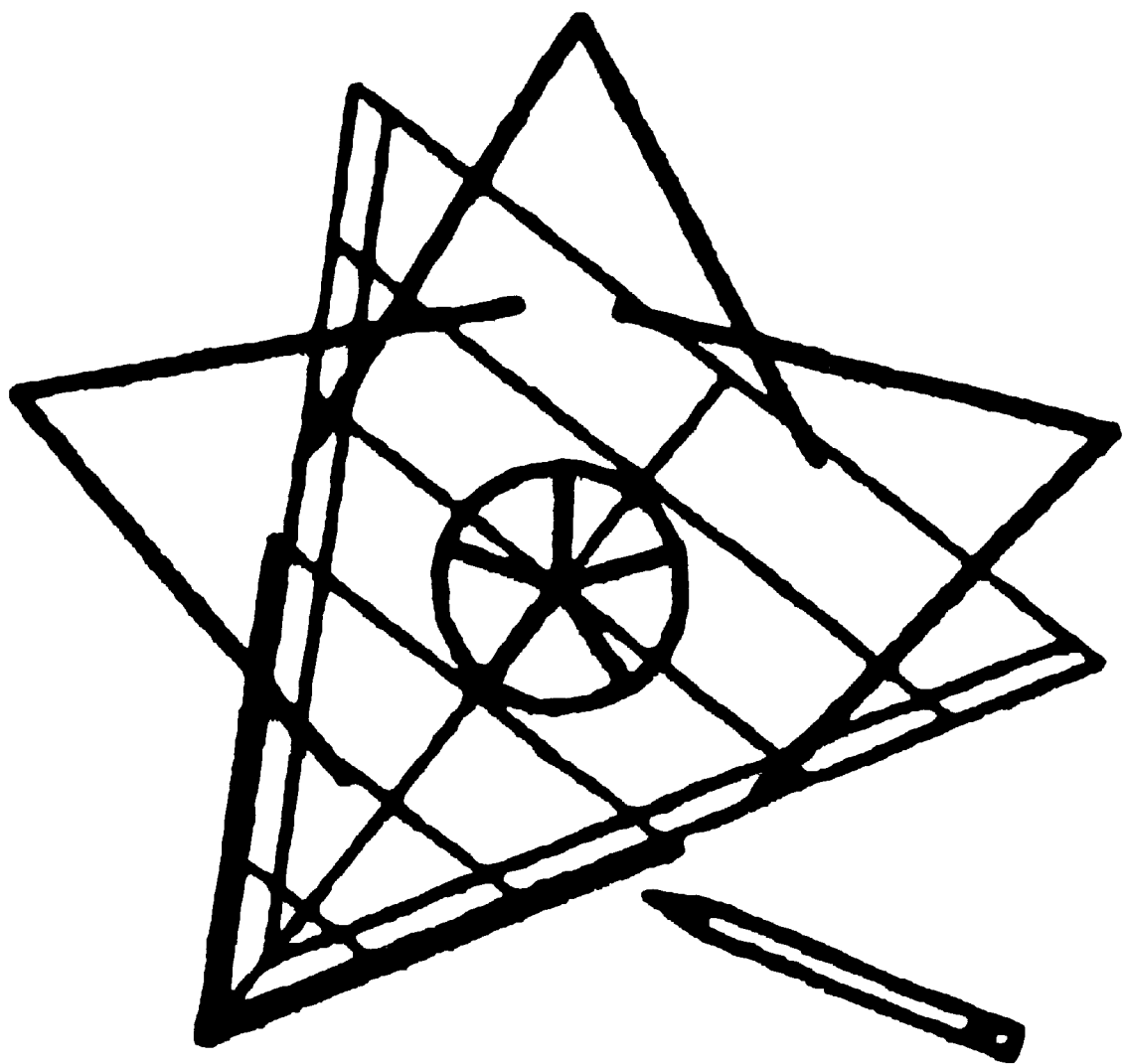
Figure 3E:
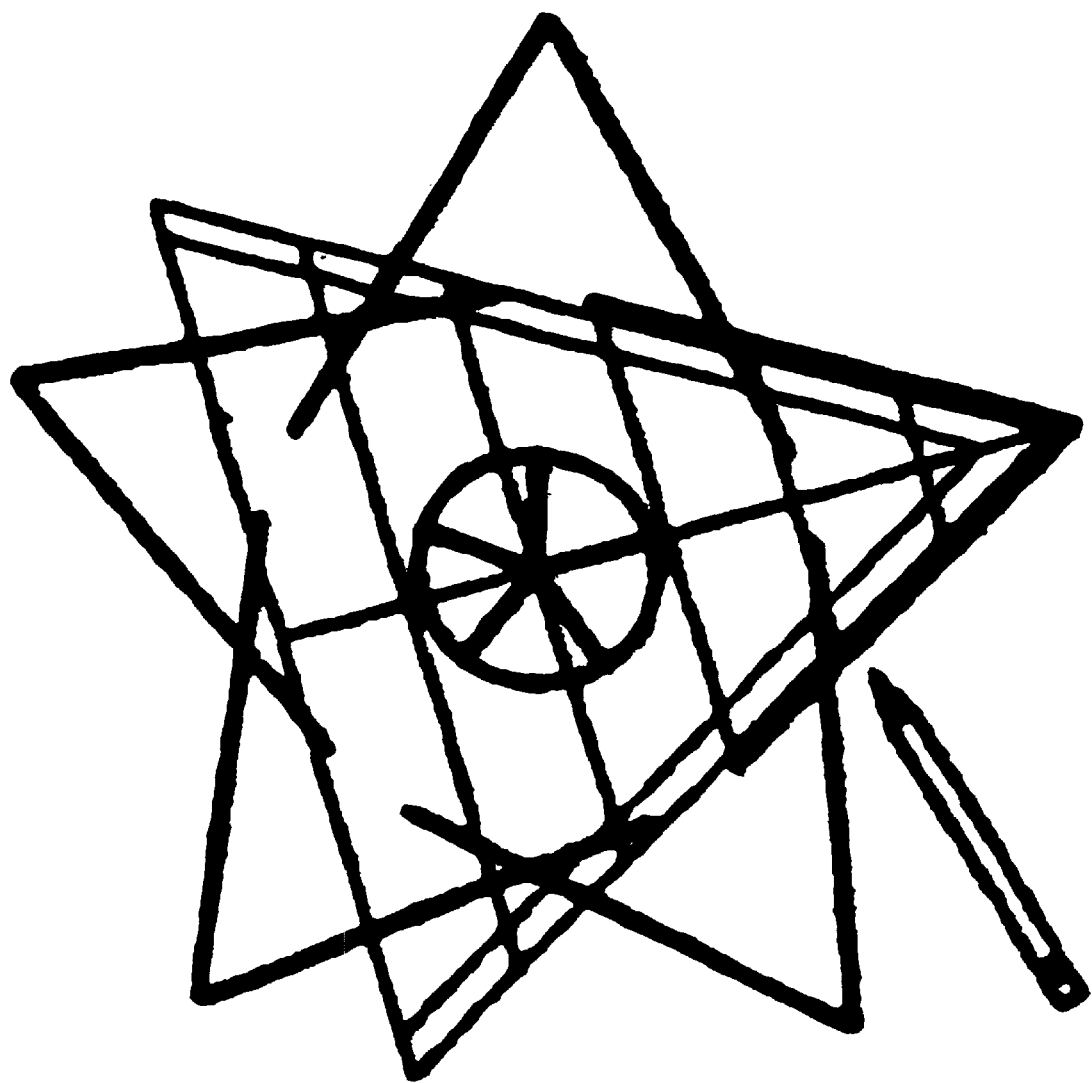

To draw a star using the present invention, a user first must choose a piece of paper, cardboard, or plastic preferably at least 1.0 inch larger than the dimensions of the star to be drawn. Next, the center of the drawing surface should be marked. As shown in FIGS. 3A–3E, the guide piece 14 with the number of spokes 18 to match the points of the star should be positioned with the central point 22 over the center of the drawing surface. The stencil 10 is then placed over top of guide piece 14 with the vertical centerline directly above one of the spokes 18. The user than draws a line around the top of the stencil 10 from a guideline 30 on the first side 34 of the stencil 10 to the same guideline 30 on the second side 38 of the stencil 10. The stencil 10 is then rotated as shown in FIG. 3B, placing the vertical centerline 26 on top of another of the spokes 18 with the same point of the vertical centerline 26 remaining on top of the central point 22 of the guide piece 14. The steps are repeated as shown in FIGS. 3C–3E until all points of the star have been drawn.

The specific guidelines 30 to use in drawing the star are chosen based upon a chart that accompanies the stencil 10. The chart that accompanies the stencil 10 with a 45 degree angle at the top 27 of the stencil, as shown in FIG. 1, appears as follows:

| Number Of Points | Ruler Measure | | | | | |
|---|---|---|---|---|---|---|
| | 2" | 3" | 4" | 5" | 6" | 7" |
| | | | Approx. Height Of Star | | | |
| 3 | 3" | 4.5" | 6" | 7.5" | 9" | 10.5" |
| 4 | 4" | 6" | 8" | 10" | 12" | 14" |
| 5 | 3.625" | 5.375" | 7.25" | 9" | 10.875" | 12.625" |
| 6 | 4" | 6" | 8" | 10" | 12" | 14" |
| 7 | 3.875" | 5.75" | 7.625" | 9.5" | 11.375" | 13.25" |
| 8 | 4" | 6" | 8" | 10" | 12" | 14" |

For example, to a draw a 7-pointed star having an approximate height of 9.5 inches, one would use the 5.0 inch guideline 30 on the stencil 10 shown in FIG. 1 as the starting and ending point of drawing the star. In addition, the 5.0 inch guideline 30 would pass through the central point 22 of the guide piece 14. The chart shown above may vary depending on the shape and size of the stencil 10.

Figure 4:
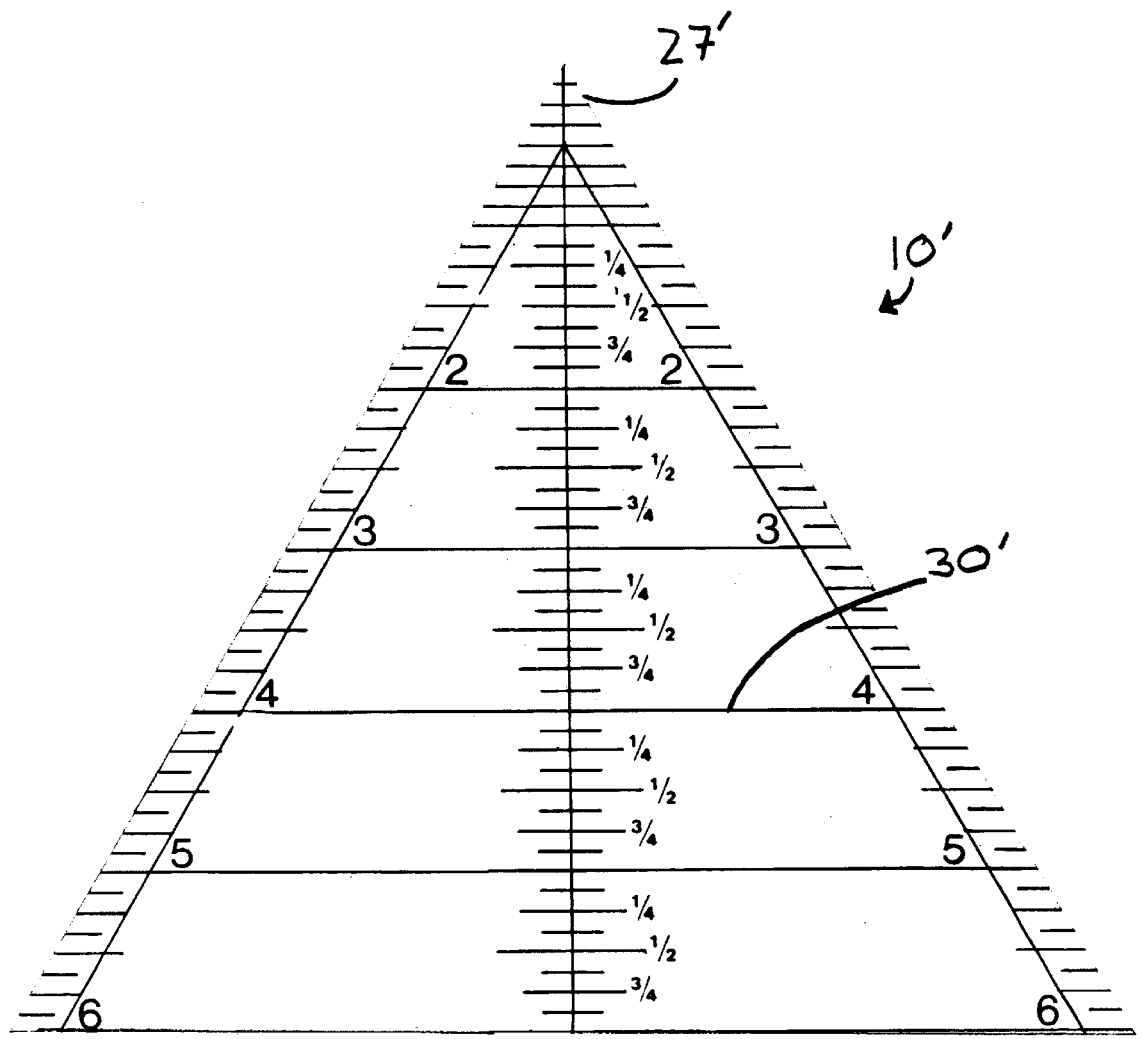
FIG. 4 shows an alternate embodiment of a stencil according to the present invention.

FIG. 4 shows an alternate embodiment of the invention wherein the stencil 10' is an equilateral triangle and has a 60 degree angle at the top 27' of the stencil 10'. The stencil 10' shown in FIG. 4 is used in the same manner as the stencil 10 shown in FIG. 1. However, the shapes of the stars drawn with stencil 10' are slightly different than those drawn with stencil 10. The stars drawn with stencil 10' have wider points. The specific guidelines 30' to use in drawing the stars with stencil 10' are chosen based upon a chart that accompanies the stencil 10'. The chart that accompanies the stencil 10' with a 60 degree angle at the top 27' of the stencil 10', as shown in FIG. 4, appears as follows:

| Number Of Points | Ruler Measure | | | | |
|---|---|---|---|---|---|
| | 2" | 3" | 4" | 5" | 6" |
| | | | Approx. Height Of Star | | |
| 4 | 4" | 6" | 8" | 10" | 12" |
| 5 | 3.625" | 5.375" | 7.25" | 9" | 10.875" |
| 6 | 4" | 6" | 8" | 10" | 12" |
| 7 | 3.875" | 5.75" | 7.625" | 9.5" | 11.375" |
| 8 | 4" | 6" | 8" | 10" | 12" |

Other configurations of the stencil 10 may also be used, and the discussion of a stencil 10 with a 45 degree angle and a stencil 10' with a 60 degree angle should not be construed to limit the scope of the invention.

The present invention may be used to created applique stars by adding a 0.25 inch seam allowance to all sides of the star pattern. The first star preferably is drawn with a solid line, and a second star is drawn with a dotted line around the first star to create a cutting line.

Patchwork stars may also be drawn by drawing lines from the center of a star to the points where two star sides intersect. By adding a 0.25 inch seal allowance around one of the diamonds created, a template is created for producing the patch that will make up the patchwork star.

Layered stars may also be drawn by drawing a plurality of stars using the same or different guideline measurements for each star and by rotating the guide pieces 14.

The preferred embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

Having thus described the invention, it is now claimed.

We claim:

1. A method of drawing a star on a drawing surface using a guide piece having a plurality of spokes radiating from a central point and a triangular stencil having a plurality of guidelines extending from a first side of said stencil to a second side of said stencil and a vertical centerline, said method comprising the steps of:

marking a center of said drawing surface;

placing said guide piece on drawing surface with said central point above said center of said drawing surface;

placing said stencil on said guide piece with said vertical centerline over one of said plurality of spokes and with one of said plurality of guidelines passing through said central point;

drawing lines using said stencil as a guide along said first and second sides of said stencil;

rotating said stencil with said vertical centerline over another one of said plurality of spokes and with said one of said plurality of guidelines passing through said central point;

drawing lines using said stencil as a guide along said first and second sides of said stencil; and, repeating said steps of rotating and drawing as often as needed until said star is completed.

2. The method of claim 1 further comprising the step of:

adding a seam allowance around said star by drawing a second star around said star, said second star being drawn with a second of said plurality of guidelines passing through said central point of said guide piece.

3. The method of claim 1 wherein said seam allowance is approximately 0.25 inch.

4. The method of claim 1 further comprising the steps of:

drawing lines from said center of said drawing surface to points where sides of said star intersect to create a plurality of diamond shaped figures;

adding a seam allowance around one of said diamond shaped figures to create a template for a patchwork star.

5. The method of claim 1 further comprising the step of:

drawing a second star from said center point of said drawing surface and with said vertical line of said stencil passing through points where sides of said star intersect to create layered stars.

* * * * *